(12) United States Patent
Sherlekar et al.

(10) Patent No.: US 12,524,594 B2
(45) Date of Patent: Jan. 13, 2026

(54) MIXED DIFFUSION BREAK FOR CELL DESIGN

(71) Applicant: Synopsys, Inc., Mountain View, CA (US)

(72) Inventors: Deepak Dattatraya Sherlekar, Cupertino, CA (US); Victor Moroz, Saratoga, CA (US); Jamil Kawa, Campbell, CA (US)

(73) Assignee: Synopsys, Inc., Sunnyvale, CA (US)

( * ) Notice: Subject to any disclaimer, the term of this patent is extended or adjusted under 35 U.S.C. 154(b) by 1106 days.

(21) Appl. No.: 17/473,831

(22) Filed: Sep. 13, 2021

(65) Prior Publication Data
US 2022/0085018 A1 Mar. 17, 2022

Related U.S. Application Data

(60) Provisional application No. 63/078,168, filed on Sep. 14, 2020.

(51) Int. Cl.
*H10D 89/10* (2025.01)
*G06F 30/31* (2020.01)
(Continued)

(52) U.S. Cl.
CPC ............ *G06F 30/392* (2020.01); *G06F 30/31* (2020.01); *H10B 20/00* (2023.02); *H10D 84/00* (2025.01);
(Continued)

(58) Field of Classification Search
CPC .... G06F 30/392; G06F 30/31; G06F 2119/06; G06F 2119/12; H10D 89/10; H10D 84/00
See application file for complete search history.

(56) References Cited

U.S. PATENT DOCUMENTS

2016/0117431 A1* 4/2016 Kim ................... G06F 30/392
716/119
2017/0287933 A1* 10/2017 Chen .................... H10D 62/115
(Continued)

OTHER PUBLICATIONS

Heo, S. I. et al. "Diffusion Break-Aware Leakage Power Optimization and Detailed Placement in Sub-10nm VLSI." Proceedings of the 24th Asia and South Pacific Design Automation Conference, Jan. 2019, pp. 550-556.
(Continued)

*Primary Examiner* — David Vu
*Assistant Examiner* — Brandon C Fox
(74) *Attorney, Agent, or Firm* — Fenwick & West LLP

(57) ABSTRACT

Embodiments relate to designing an integrated circuit using a cell that includes a mixed diffusion break. The cell has first and second edges, where the second edge is opposite from the first edge. The cell has a first dummy transistor spanning between the first edge of the cell and an edge of a first diffusion break. The first diffusion break may be centered under the first dummy transistor. The first dummy transistor and the first diffusion break may form a single diffusion break. Additionally, the cell has a second dummy transistor spanning between the second edge of the cell and an edge of a second diffusion break. The second dummy transistor may span a distance of half of a gate pitch into the cell and be centered over the second edge. The second dummy transistor and the second diffusion break may form a double diffusion break.

19 Claims, 8 Drawing Sheets

(51) Int. Cl.
  *G06F 30/392* (2020.01)
  *H10B 20/00* (2023.01)
  *H10D 84/00* (2025.01)
  *G06F 119/06* (2020.01)
  *G06F 119/12* (2020.01)

(52) U.S. Cl.
  CPC ......... *H10D 89/10* (2025.01); *G06F 2119/06* (2020.01); *G06F 2119/12* (2020.01)

(56) References Cited

U.S. PATENT DOCUMENTS

| | | | |
|---|---|---|---|
| 2020/0057830 A1 | 2/2020 | Azmat et al. | |
| 2020/0151298 A1* | 5/2020 | Kim | G06F 30/392 |
| 2020/0373196 A1* | 11/2020 | Li | H10D 84/0158 |
| 2025/0176256 A1* | 5/2025 | Baruah | H10D 84/85 |

OTHER PUBLICATIONS

PCT International Search Report and Written Opinion, PCT Application No. PCT/US2021/050119, Jan. 3, 2022, 17 pages.

\* cited by examiner

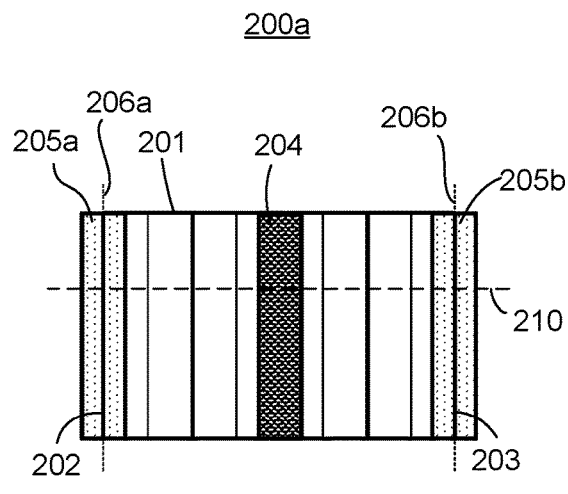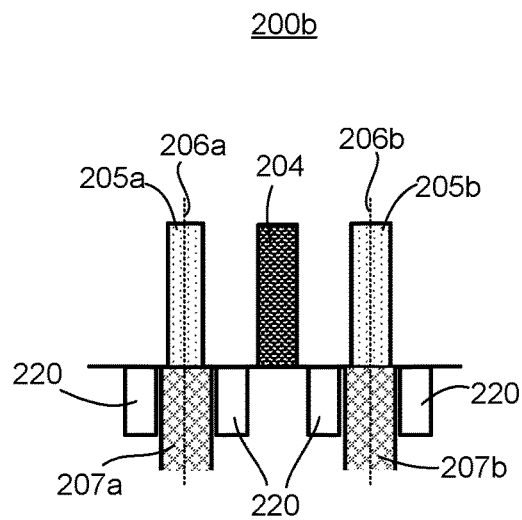
FIG. 2A  FIG. 2B
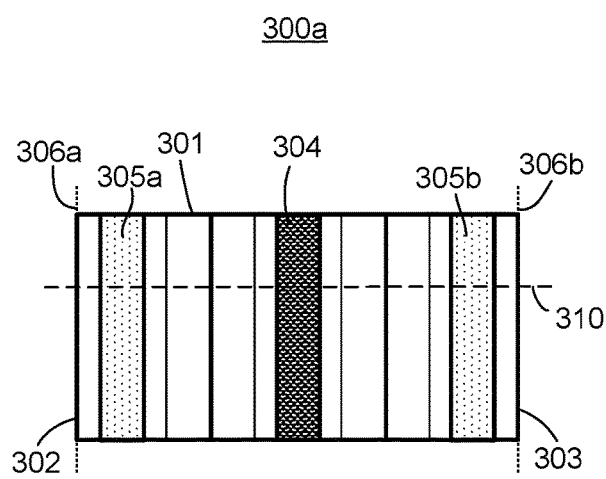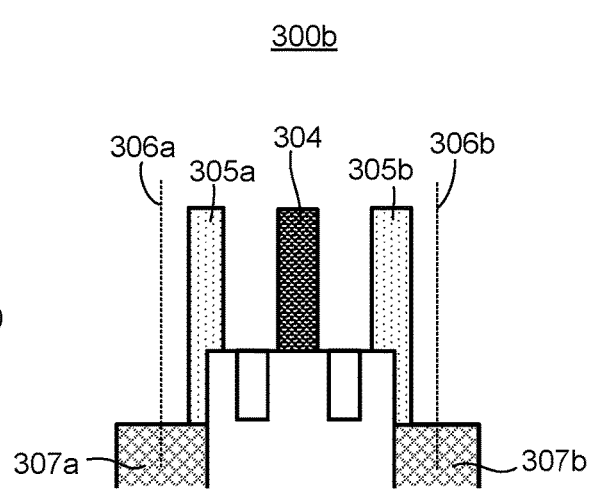
FIG. 3A  FIG. 3B

MIXED DIFFUSION BREAK FOR CELL DESIGN

CROSS-REFERENCE TO RELATED APPLICATION

This application claims the benefit of U.S. Provisional Application No. 63/078,168, filed Sep. 14, 2020, which is incorporated by reference in its entirety.

TECHNICAL FIELD

The present disclosure relates to integrated circuits and in particular to diffusion breaks for cell-based designing of integrated circuits.

BACKGROUND

Modern semiconductor processes break the continuity of a diffusion to electrically isolate physically adjacent diffusions at different potentials. Two types of diffusion breaks are commonly used: single diffusion break (SDB) and double diffusion break (DDB). In SDB, the break is centered under an isolation gate or a dummy gate, which can be referred to as a poly or dummy transistor, separating the different but adjacent diffusions. For DDB, the break is centered halfway between a pair of dummy gates separating the adjacent diffusions. Dummy gates tied to supply or ground offer a third mechanism, referred to as continuous diffusion, to isolate physically adjacent diffusions with the same area efficiency as SDB, but with higher performance at the cost of higher leakage.

In cell-based design, library cells employ the SDB or DDB mechanism at their left and right boundaries to isolate the diffusion in the cell from adjacent cells at various levels of design realization including, for example, the chip level. Thus, SDB cells have dummy gates centered about their left and right boundaries, while DDB cells have the dummy gates positioned half a contacted gate (poly) pitch (CPP), or "gate pitch," inside their left and right boundaries. DDB cells are at least one gate pitch wider than SDB cells. Cells using continuous diffusion resemble SDB with the isolating dummy gates at the left and right boundaries. Diffusion breaks within a DDB cell may be implemented as SDB, continuous diffusion, or DDB without impacting a design constraint that they be placed such that their left/right boundaries are precisely halfway between the gate pitch grids. Similarly, diffusion breaks within SDB cells can also be implemented with a SDB, continuous diffusion, or DDB mechanism without impacting a design constraint that they be placed with their left or right boundaries aligned with the gate grid.

SUMMARY

Embodiments relate to a digital representation of a cell for designing an integrated circuit where the cell includes a first edge, a second edge at an opposite side of the first edge, a first dummy transistor and a second dummy transistor. The first dummy transistor spans between the first edge of the cell and an edge of a first diffusion break. The first diffusion break is centered under the first dummy transistor. The second dummy transistor spans between the second edge of the cell and an edge of a second diffusion break. The second dummy transistor spans a distance of half of a gate pitch in the cell.

In one or more embodiments, the first dummy transistor and the first diffusion break form a single diffusion break.

In one or more embodiments, the second diffusion break isolates a diffusion region within the cell from a diffusion region of an adjacent cell, the second diffusion break centered halfway between the second dummy transistor and a dummy transistor of the adjacent cell.

In one or more embodiments, the second dummy transistor, the dummy transistor of the adjacent cell, and the second diffusion break form a double diffusion break.

In one or more embodiments, wherein the first diffusion break is centered with the first edge of the cell.

In one or more embodiments, wherein the second diffusion break abuts the second edge of the cell.

In one or more embodiments, wherein the second dummy transistor is centered over an edge of the second diffusion break.

In one or more embodiments, wherein the cell has a width that is one half of a gate pitch greater than an integer number of gate pitches.

Embodiments also relate to designing an integrated circuit design by selecting one of a first cell, a second cell, a third cell, and a fourth cell. The first cell includes a first dummy transistor spanning between a left edge of the first cell and an edge of a first diffusion break, the first diffusion break centered under the first dummy transistor; and a second dummy transistor spanning between a right edge of the first cell and an edge of a second diffusion break, the second diffusion break centered under the second dummy transistor. The second cell includes a third dummy transistor spanning between a left edge of the second cell and an edge of a third diffusion break, the third dummy transistor spanning a distance of half of a gate pitch in the second cell; and a fourth dummy transistor spanning between a right edge of the second cell and an edge of a fourth diffusion break, the fourth dummy transistor spanning a distance of half of a gate pitch in the second cell. The third cell includes a fifth dummy transistor spanning between a left edge of the third cell and an edge of a fifth diffusion break, the fifth diffusion break centered under the fifth dummy transistor; and an sixth dummy transistor spanning between a right edge of the third cell and an edge of an sixth diffusion break, the sixth dummy transistor spanning a distance of half of a gate pitch in the third cell. The fourth cell includes a seventh dummy transistor spanning between a left edge of the fourth cell and an edge of a seventh diffusion break, the seventh dummy transistor spanning a distance of half of a gate pitch in the fourth cell; and an eighth dummy transistor spanning between a right edge of the fourth cell and an edge of an eighth diffusion break, the eighth diffusion break centered under the eighth dummy transistor. The selected cell is positioned into the integrated circuit design. Simulation of the integrated circuit design including the selected cell is performed.

In one or more embodiments, one of the first cell, the second cell, the third cell, and the fourth cell is selected by determining, for each of the four cells, performance metrics associated with positioning the respective cell adjacent to another cell in the integrated circuit design. The cell is selected based on the determined performance metrics to optimize for one or more of timing and power constraints of the integrated circuit design.

In one or more embodiments, performance metrics associated with positioning the respective cell are determined by determining a side of the respective cell to position the other cell. Responsive to determining to position the other cell at the left edge of the respective cell, a model associated with positioning the other cell at the left edge of the respective cell us accessed. The model includes the performance metrics.

In one or more embodiments, the selected cell is positioned into the integrated circuit design by replacing a previously placed cell within the integrated circuit design with the selected cell.

In one or more embodiments, the first cell includes a first single diffusion break that includes the first dummy transistor and the first diffusion break and a second single diffusion break including the second dummy transistor and the second diffusion break.

In one or more embodiments, the second cell includes a first double diffusion break including the third dummy transistor and the third diffusion break and a second double diffusion break including the fourth dummy transistor and the fourth diffusion break.

In one or more embodiments, the third cell includes a single diffusion break including the fifth dummy transistor and the fifth diffusion break and a double diffusion break includes the sixth dummy transistor and the sixth diffusion break.

In one or more embodiments, the fourth cell includes a double diffusion break including the seventh dummy transistor and the seventh diffusion break and a single diffusion break including the eighth dummy transistor and the eighth diffusion break.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 2A depicts a top-level view of a single diffusion break cell, according to one embodiment.

FIG. 2B depicts a cross-sectional view of the single diffusion break cell as described in FIG. 2A, according to one embodiment.

FIG. 3A depicts a top-level view of a double diffusion break cell, according to one embodiment.

FIG. 3B depicts a cross-sectional view of the double diffusion break cell as described in FIG. 3A, according to one embodiment.

DETAILED DESCRIPTION

Figure 1:
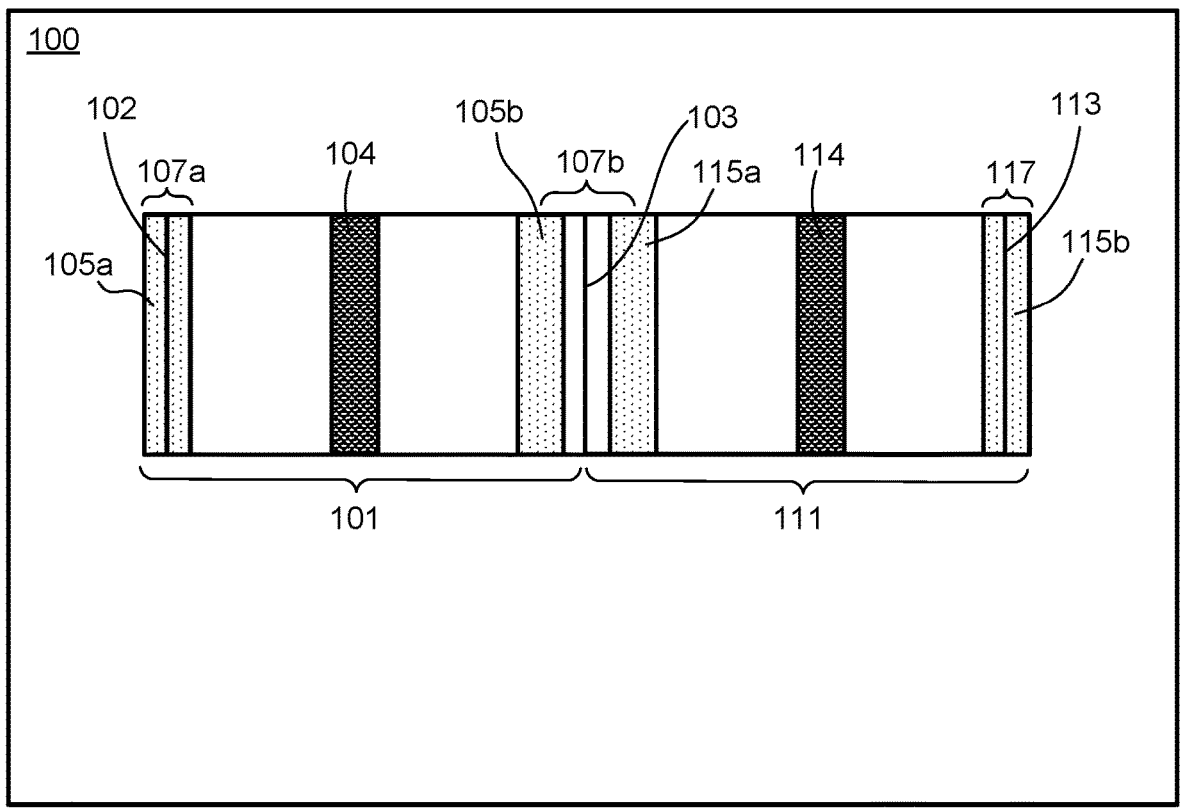
FIG. 1 illustrates integrated circuit layout generated from cells, according to one embodiment.

Aspects of the present disclosure relate to mixed diffusion breaks for cell design. Embodiments relate to various types of cells having respective diffusion breaks, including two intermediate variants between SDB and DDB. These intermediate variants enable more diverse and finer granularity of mixing of SDB and DDB when performing a cell-based design. SDB cells have lower gate input capacitance than DDB, which can compensate for some loss of performance (e.g., loss of processing speed). Further, widening SDB cells by one grid to match DDB area may increase the drive of transistors in the cell schematic, which may further shrink the performance gap with DDB. Accordingly, mixing SDB and DDB cells in the same design, using DDB where it offers benefit and using SDB elsewhere, offers performance improvements over designs that use exclusively SDB cells or DDB cells.

An electronic design automation (EDA) system, as described with reference to FIG. 9, may generate a layout for an integrated circuit. In one embodiment, an EDA system receives a cell library that includes a set of cells designed to be placed side by side in rows. The set of cells may include standard cells and modified versions of the standard cells. The EDA system may generate at least a portion of the layout for the integrated circuit by arranging instances of cells from the library. The EDA system may connect instances of the cells together to implement a desired functionality of the integrated circuit.

The EDA system may generate gridded layout designs. In a gridded design, edges of circuit components such as cells are aligned to a pre-determined grid. In some embodiments, transistor gates of a layout have a fixed distance between adjacent gates, where this fixed distance is a gate pitch. The gate pitch may be a multiple of the grid units in the pre-determined grid. As referred to herein, the terms gate pitch and grid are used to describe cell dimensions (e.g., widths) and cell placement (e.g., distance between edges of cells) within a layout design.

Embodiments of an EDA system described herein may access various types of cells having respective diffusion break mechanisms. Four example types of cells are described with reference to FIGS. 2A-5B. A first type of cell has SDB at opposite edges (e.g., left and right edges) and is referred to herein as a type 1 cell. A second type of cell has DDB at opposite edges and is referred to herein as a type 2 cell. A third type and fourth type of cell have SDB at one edge and DDB at an opposite edge. A type 3 cell refers to a cell with SDB at a left edge and DDB at a right edge. A type 4 cell refers to a cell with DDB at a left edge and SDB at a right edge. Example configurations in which the EDA system places cells with different diffusion breaks (e.g., type 3 and 4 cells), which may be referred to as mixed diffusion breaks, are described with respect to FIGS. 6A-7B.

The EDA system may access a cell library with cells having internal diffusion breaks that employ either SDB or continuous diffusion mechanisms. The EDA system may modify a width of a cell having an internal diffusion break from a minimum width associated with SDB to a width of a mixed diffusion break cell that is half a gate pitch larger (e.g., cells shown in FIGS. 4A-5B). The EDA system may also modify the width of the cell from the minimum width to a width of a DDB cell that is one gate pitch larger (e.g., the cell shown in FIGS. 3A-3B). Because the EDA system enables the width to increase by half a gate pitch in granularity (e.g., as opposed to an integer number of gate pitches), which in turn enables the performance speed to increment at a finer granularity, the EDA system improves optimization of area and performance at the chip level.

FIG. 1 illustrates an integrated circuit layout generated from cells, according to one embodiment. Integrated circuit layout 100 includes, among others, cells 101 and 111. The cells are organized into a single row and employ mixed diffusion breaks. A cell may be bounded on four sides or edges and represent any generic cell such as an inverter, a NAND gate, a NOR gate, or a flip-flop. Although layout 100 has been simplified to promote clarity, layout 100 may include additional cells that are not depicted. A cell refers to a logical cell for performing a logical function. One or more cells may be combined to form a physical cell. For example, a single physical cell of a multi-bit cell may include multiple logical single-bit cells.

Furthermore, a distance between successive transistors (e.g., either dummy or active transistors) may be uniform in circuit designs with SDB and DDB. For example, the distance between successive transistors may be the same. Alternatively, the distance between successive transistors need not be uniform. Figures herein may depict varying distances between successive transistors. For example, in FIG. 1, a distance between successive transistors 105a and 104 is depicted as the same distance between successive transistors 104 and 105b. However, there is a difference distance between successive transistors 105b and 115a. Alternatively, the distances between the depicted successive transistors may be uniform. For example, the distance between transistors 105b and 115a may be the same as the distance between 104 and 105b.

A diffusion break refers to a break in a diffusion region that extends from a first edge of a cell to a second edge that is opposite to the first edge of the cell. For example, a diffusion region may extend from edge 102 to edge 103 of cell 101. A diffusion break can separate active regions of adjacent cells. For example, diffusion break 107b can separate active regions of cells 101 and 111, where the active regions contain active transistors 104 and 114, respectively. Diffusion break 107a can separate cell 101 from an active region of a cell contacting edge 102 of cell 101. Similarly, diffusion break 117 can separate cell 111 from an active region of a cell contacting edge 113 of cell 111. Dummy transistors may be located at the edges of cells and isolate one active transistor from a nearby active transistor. For example, dummy transistors 105b and 115a may isolate active transistor 104 from active transistor 114.

Two types of diffusion breaks are commonly used: single diffusion break (SDB) and double diffusion break (DDB). In SDB, the break is centered under a dummy transistor. For DDB, the break is centered halfway between a pair of dummy transistors separating the adjacent diffusions. An example DDB is shown in FIG. 1. Diffusion break 107b is a DDB and extends from one dummy transistor to the next (e.g., from dummy transistor 105b to dummy transistor 115a). FIG. 1 also shows example SDBs. Diffusion break 107a is a first example SDB, where diffusion break 107a is centered under dummy transistor 105a. Similarly, diffusion break 117 is a second example SDB that is centered under dummy transistor 115b.

Layout 100 shows cells 101, 111 having a mixed diffusion break having a combination of SDB at one edge of a cell and DDB at an opposite edge of the cell. The DDB may offer increased performance speeds over SDB even if DDB is at one edge rather than both. This may be due to the nature of DDB's performance benefit coming primarily from one edge of a cell, as opposed to the DDB mechanisms at both sides contributing equally to the increase in performance speed. When an area in a layout is critical but performance of the cells is prioritized, an EDA system can use cells having mixed diffusion break mechanisms to gain most of the performance benefit from DDB at one edge while using the SDB at another edge. Thus, the mixed diffusion break enables the EDA system to balance both performance and area benefits without sacrificing much of one over the other. Meanwhile, the EDA system can emphasize area improvements by using SDB at opposite edges or emphasize performance improvements by using DDB at opposite edges.

While the EDA system can make the diffusion break mechanisms available for selection by a user, the EDA system can additionally or alternatively determine which type of diffusion break to employ, making the determinations based on various design parameters. In one embodiment, the EDA system may create distinct cell layouts for each type of diffusion break. For example, the EDA system can create four different cell layouts for each of the cells shown in FIGS. 2A-4B, which each have different permutations of diffusion breaks at opposite edges of the cell.

In another embodiment, the EDA system can construct layouts of type 1 cells having SDB at opposite edges (e.g., FIGS. 2A-2B) to provide additional layout automation and reduce design effort of a user. In one example, the system extends a type 1 cell at the right edge of the cell by half a gate pitch and creates the type 3 cell depicted in FIGS. 4A-4B. In another example, the system extends a type 1 cell at the left edge by half a gate pitch, creating the type 4 cell depicted in FIGS. 5A-5B. In yet another example, the system extends the type 1 cell at both left and right edges to create the type 2 cell in FIGS. 3A-3B.

At the block level of an IC design, the EDA system can select a particular cell type after cell placement and determine which cell type should be constructed based on various design parameters. The terms block level or cell level refers to a view of the design on an EDA tool depicting two or more cells. The EDA system can extract an SDB cell and characterize timing and power metrics of each of the four types of cells at the SDB cell's position in the IC design, capturing performance metrics of the four cell type variants to determine which type should be selected to improve the performance of the IC design. This method may be used when better pin locations are not possible with the larger DDB-style layouts, or the low usage of the cell does not warrant the extra layout effort. The availability of various types of diffusion break mechanism layouts enables an EDA system to perform this post-placement tuning of cells. By offering the various diffusion break mechanism types and post-placement tuning, the EDA system provides cell design configurations that are flexible to a user's layout design requirements.

FIGS. 2A and 2B depict a single diffusion break cell, according to one embodiment. FIG. 2A depicts top view 200a of cell 201 and FIG. 2B depicts cross sectional view 200b of cell 201 taken across line 210. Top view 200a shows active transistor 204 and dummy transistors 205a and 205b of cell 201. Reference lines 206a and 206b (dotted lines) align with the center of diffusion breaks beneath the dummy transistors 205a and 205b, respectively. Cross sectional view 200b shows diffusion breaks 207a and 207b that are centered with dummy transistors 205a and 205b along lines 206a and 206b. Cross sectional view 200b includes doping regions 220, which include the doped sources and drains of the transistors of cell 201 (e.g., active transistor 204). Doping regions are similarly depicted in the cross sectional views of FIGS. 3B, 4B, 5B, 6B, and 7B.

Cell 201 includes left edge 202 at one side of cell 201 and right edge 203 at the opposite side of cell 201. Active transistor 204 performs a designated function (e.g., processing, power gating, cache, etc.). Although only one transistor is described as being included in cell 201, cell 201 may include multiple active transistors. Further, active transistor 204 may not be located at the center of cell 201, and may be offset to the left or the right side of cell 201. While cell 201 and other cells depicted in FIGS. 3A-7B are shown as having one active transistor to promote clarity, a cell can include multiple active transistors. Active transistor 204 of cell 201 can be separated from active transistors of neighboring cells using the diffusion breaks 207a and 207b (e.g., during and after cell placement of the IC design process).

Cell 201 is a type 1 cell where single diffusion breaks are provided at both edges 202 and 203. A first SDB includes dummy transistor 205a and diffusion break 207a. A second SDB includes dummy transistor 205b and diffusion break 207b. Dummy transistor 205a and diffusion break 207a are centered at edge 202. Dummy transistor 205b and diffusion break 207b are centered at edge 203. Cells of type 1 may have a width that is an integer number of gate pitches.

FIGS. 3A and 3B depict a double diffusion break cell, according to one embodiment. FIG. 3A depicts top view 300a of cell 301 and FIG. 3B depicts cross sectional view 300b of cell 301 taken across line 310. Top view 300a shows active transistor 304 and dummy transistors 305a and 305b of cell 301. Reference lines 306a and 306b (dotted lines) align with the center of diffusion breaks beneath the dummy transistors 305a and 305b, respectively. Cross sectional view 300b shows diffusion breaks 307a and 307b that are centered at edges 302 and 303, respectively. In some embodiments, cells having DDB at one or more edges, such as cell 301, may have a diffusion break that abuts an edge of the cell. For example, although diffusion break 307a is depicted as extending beyond edge 302, the layout of cell 301 (e.g., as accessed by an EDA system during IC design) may not extend beyond edges 302 and 303. Accordingly, diffusion break 307a may abut edge 302 and diffusion break 307b may abut edge 303.

Cell 301 includes left edge 302 at one side of cell 301 and right edge 303 at the opposite side of cell 301. Active transistor 304 of cell 301 can be separated from active transistors of neighboring cells using the diffusion breaks 307a and 307b (e.g., during and after cell placement of the IC design process). Cell 301 is a type 2 cell where double diffusion breaks are provided at both edges 302 and 303. A first DDB includes dummy transistor 305a and diffusion break 307a. A second DDB includes dummy transistor 305b and diffusion break 307b. Type 2 cells may have dummy transistors positioned half a gate pitch inside their left and right edges, respectively. Dummy transistor 305a can be centered over an edge of diffusion break 307a, where diffusion break 307a spans half a gate pitch within cell 301 from edge 302. Similarly, dummy transistor 205b can be centered over an edge of diffusion break 207b, where diffusion break 307b spans half a gate pitch within cell 301 from edge 303.

Cells of type 2 may have a width that is an integer number of gate pitches. Type 2 cells may be at least one gate pitch wider than type 1 cells. In some embodiments, cells of type 2 have a width that is one gate pitch wider than cells of type 1 by having a width that is half a gate pitch wider on the left and right edges of a type 1 cell. This increase in width may be to accommodate for the increased width of a double diffusion break as compared to the width of a single diffusion break.

Figure 4A:
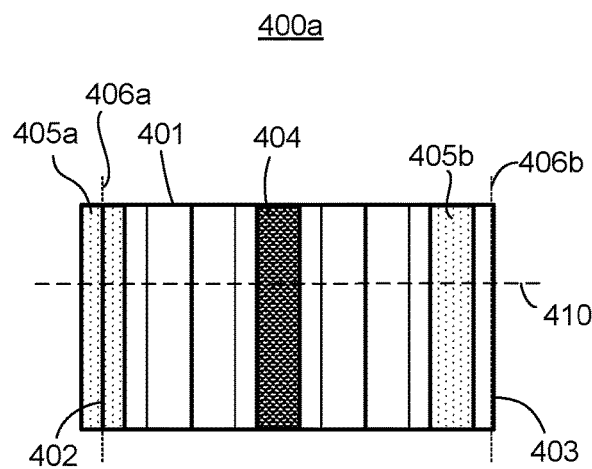
FIG. 4A depicts a top-level view of a mixed diffusion break cell with a single diffusion break on the left side, according to one embodiment.
Figure 4B:
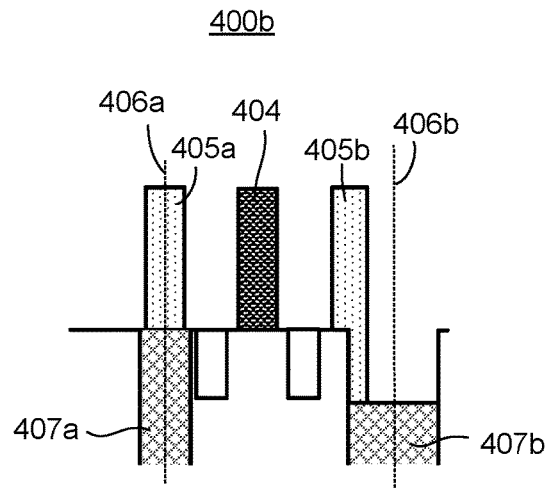
FIG. 4B depicts a cross-sectional view of the mixed diffusion break cell with a single diffusion break on the left side as described in FIG. 4A, according to one embodiment.

FIGS. 4A and 4B depict mixed diffusion break cell with a single diffusion break on the left side, according to one embodiment. FIG. 4A depicts top view 400a of cell 401 and FIG. 4B depicts cross sectional view 400b of cell 401 taken across line 410. Top view 400a shows active transistor 404 and dummy transistors 405a and 405b of cell 401. Reference lines 406a and 406b (dotted lines) align with the center of diffusion breaks beneath the dummy transistors 405a and 405b, respectively. Cross sectional view 400b shows diffusion break 407a that is centered with dummy transistor 405a along line 406a. Diffusion break 407b is beneath dummy transistor 405b and centered at line 406b of cell 401.

Cell 401 includes left edge 402 at one side of cell 401 and right edge 403 at the opposite side of cell 401. Active transistor 404 of cell 401 can be separated from active transistors of neighboring cells using the diffusion breaks 407a and 407b (e.g., during and after cell placement of the IC design process). Cell 401 is referred to herein as a type 3 cell due to the presence of a single diffusion break at left edge 402 and a double diffusion break at right edge 403. The SDB includes dummy transistor 405a and diffusion break 407a. The DDB includes dummy transistor 405b and diffusion break 407b.

Type 3 cells may have one dummy transistor positioned at one edge of the cells and another dummy transistor positioned half a gate pitch within an opposite edge of the cells. For example, dummy transistor 405a and diffusion break 407a are centered at edge 402. Dummy transistor 405a spans between edge 402 and an edge of diffusion break 407a. Dummy transistor 405b can be centered over an edge of diffusion break 407b, where diffusion break 407b spans half a gate pitch within cell 401 from edge 403. Dummy transistor 405b spans between edge 403 and an edge of diffusion break 407b (e.g., the edge aligned with the center of transistor 405b). Thus, the center of dummy transistor 405b is half a gate pitch from edge 403 and spans a distance, or width, of half of a gate pitch in cell 401.

Cells of type 3 may have a width that is half a gate pitch greater than an integer number of gate pitches. In some embodiments, the center of the DDB at one edge of the cell is half a gate pitch wider from the center of the cell than the center of the SDB at the opposite edge is from the center. For example, edge 403 is half a gate pitch farther from the center of cell 401 (e.g., at the center of transistor 404) than is edge 402.

Figure 5A:
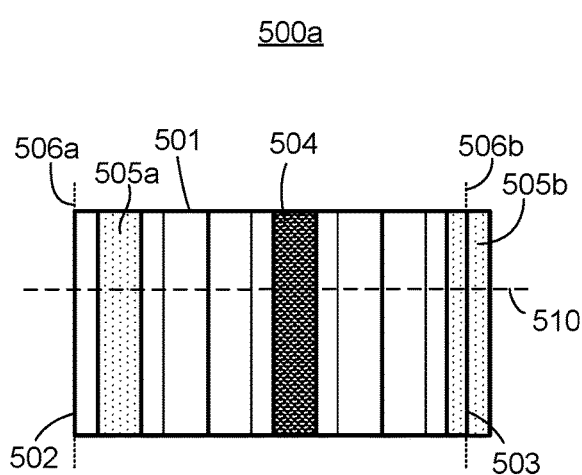
FIG. 5A depicts a top-level view of a mixed diffusion break cell with a double diffusion break mechanism on the left side, according to one embodiment.
Figure 5B:
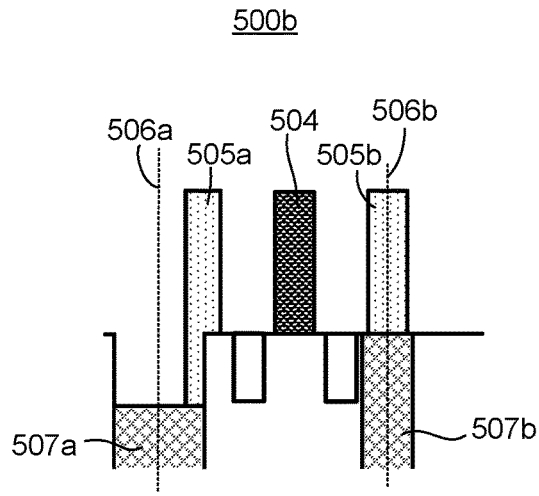
FIG. 5B depicts a cross-sectional view of the mixed diffusion break cell with a double diffusion break mechanism on the left side as described in FIG. 5A, according to one embodiment.

FIGS. 5A and 5B depict mixed diffusion break mechanism cell with a double diffusion break mechanism on the left side, according to one embodiment. FIG. 5A depicts top view 500a of cell 501 and FIG. 5B depicts cross sectional view 500*b* of cell 501 taken across line 510. Top view 500*a* shows active transistor 504 and dummy transistors 505*a* and 505*b* of cell 501. Reference lines 506*a* and 506*b* (dotted lines) align with the center of diffusion breaks beneath the dummy transistors 505*a* and 505*b*, respectively. Cross sectional view 500*b* shows diffusion break 507*a* beneath dummy transistor 505*a* and centered at line 506*a* of cell 501. Diffusion break 507*b* is centered with dummy transistor 505*b* along line 506*b*.

Cell 501 includes left edge 502 at one side of cell 501 and right edge 503 at the opposite side of cell 501. Active transistor 504 of cell 501 can be separated from active transistors of neighboring cells using the diffusion breaks 507*a* and 507*b* (e.g., during and after cell placement of the IC design process). Cell 501 is referred to herein as a type 4 cell due to the presence of a double diffusion break at left edge 502 and a single diffusion break at right edge 503. The DDB includes dummy transistor 505*a* and diffusion break 507*a*. The SDB includes dummy transistor 505*b* and diffusion break 507*b*.

Similar to type 3 cells (e.g., cell 401 of FIGS. 4A and 4B), type 4 cells such as cell 501 have a SDB at one edge and a DDB at another edge. For example, dummy transistor 505*a* is centered over an edge of diffusion break 507*a*, where diffusion break 507*a* spans half a gate pitch within cell 501 from edge 502. Dummy transistor 505*a* spans between edge 502 and an edge of diffusion break 507*a*. Thus, the center of dummy transistor 505*a* is half a gate pitch from edge 502 and spans a distance of half of a gate pitch in cell 501. Dummy transistor 505*b* and diffusion break 507*b* are centered at edge 503. Similar to type 3 cells, cells of type 4 may have a width that is half a gate pitch greater than an integer number of gate pitches due to the width of cell edge having a DDB being wider by half a gate pitch than the edge having a SDB from the center of the cell. For example, edge 502 is half a gate pitch farther from the center of cell 501 (e.g., at the center of transistor 504) than is edge 503.

Figure 6A:
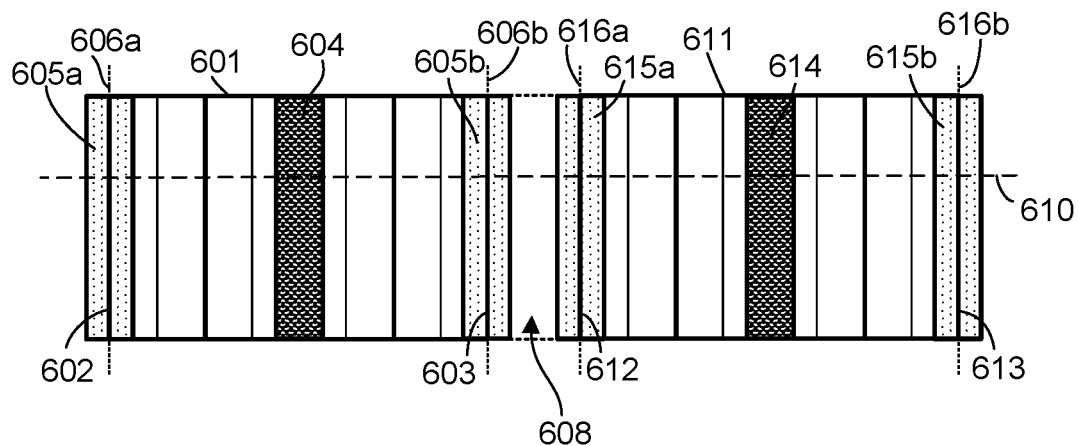
FIG. 6A depicts a top-level view of single diffusion break cells placed one gate pitch apart from one another, according to one embodiment.
Figure 6B:
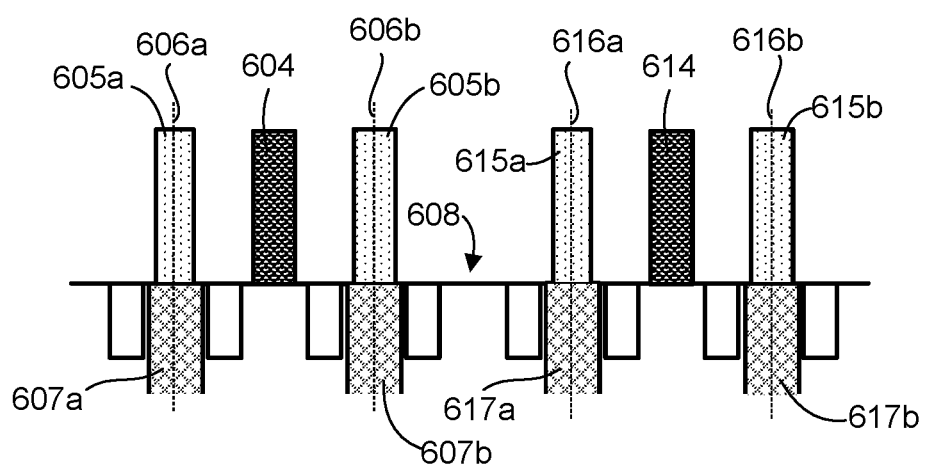
FIG. 6B depicts a cross-sectional view of single diffusion break cells placed one gate pitch apart from one another as described in FIG. 6A, according to one embodiment.

FIGS. 6A and 6B depict the placement of two single diffusion break cells one gate pitch apart from each other, according to one embodiment. An EDA system may access a library of cells for placement next to one another in an IC design layout. The library may include cells of types 1-4 as described with reference to FIGS. 2A-5B. The EDA system may place cells abutting one another (e.g., an edge of one cell is placed zero gate pitches apart from an edge of an adjacent cell). In some embodiments, the EDA system may place cells at least one gate pitch apart from one another. For example, as shown in FIGS. 6A and 6B, the EDA system may place type 1 cells by space 608 that is one gate pitch in width.

Cells 601 and 611, similar to cell 201, are type 1 cells having a SDB at both edges of the cells. FIG. 6A depicts top view 600*a* of cells 601 and 611 and FIG. 4B depicts cross sectional view 400*b* of cells 601 and 611 at line 610. Top view 600*a* shows active transistor 604 and dummy transistors 605*a* and 605*b* of cell 601 and active transistor 614 and dummy transistors 615*a* and 615*b* of cell 611. Reference lines 606*a*, 606*b*, 616*a*, and 616*b* (dotted lines) align with the center of diffusion breaks beneath the dummy transistors 605*a*, 605*b*, 615*a*, and 615*b*, respectively. Cross sectional view 600*b* shows diffusion breaks 607*a*, 607*b*, 617*a*, and 617*b* that are centered with dummy transistors 605*a*, 605*b*, 615*a*, and 615*b* along lines 606*a*, 606*b*, 616*a*, and 616*b*, respectively.

Cell 601 includes left edge 602 at one side of cell 601 and right edge 603 at the opposite side of cell 601. Cell 611 includes left edge 612 at one side of cell 611 and right edge 613 at the opposite side of cell 611. Active transistor 604 of cell 601 is separated from active transistor 614 of neighboring cell 611 through diffusion breaks 607*b* and 617*a*. A first SDB includes dummy transistor 606*a* and diffusion break 607*a*, a second SDB includes dummy transistor 606*b* and diffusion break 607*b*, a third SDB includes dummy transistor 616*a* and diffusion break 617*a*, and a fourth SDB includes dummy transistor 606*d* and diffusion break 617*b*.

In some embodiments, the EDA system may receive a library of cells having diffusion breaks that are exclusively of type 1 (i.e., a library without a distinct layout for DDB or mixed diffusion break mechanism cells). The EDA system may place the type 1 cells a predetermined distance apart and modify the type of the placed cells. For example, the EDA system places cells 601 and 611 one gate pitch apart and can modify one or more of cells 601 or 611 into alternative cell types (e.g., cell types 2-4). Because the EDA system placed cells 601 and 611 one gate pitch apart, the EDA system allowed for enough space between the cells to expand the width of cells 601 and 611 at edges 603 and 612, respectively, and change the cell type. An example modification is described with reference to FIGS. 7A and 7B.

Figure 7A:
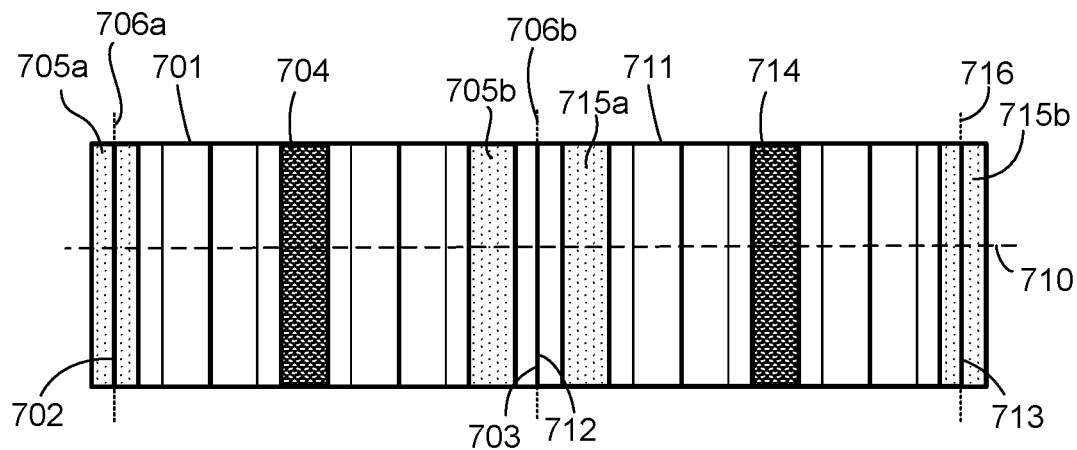
FIG. 7A depicts a top-level view of mixed diffusion break cells adjacent to one another, according to one embodiment.
Figure 7B:
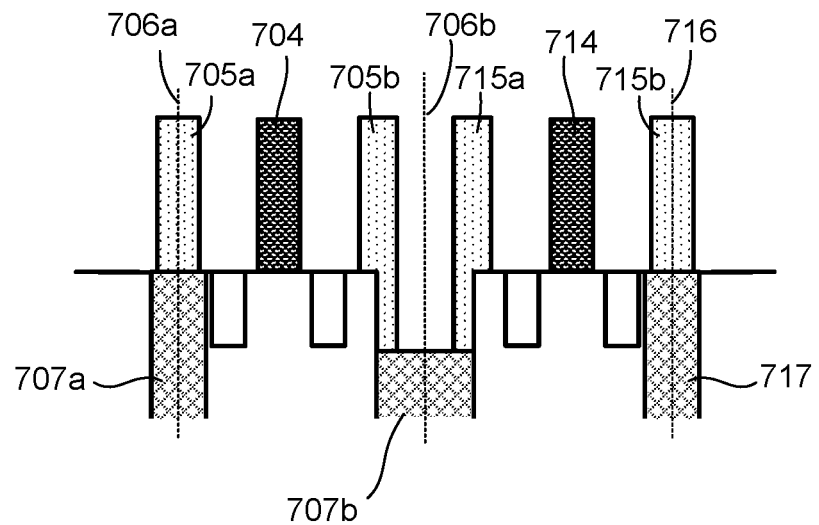
FIG. 7B depicts a cross-sectional view of mixed diffusion break cells adjacent to one another as described in FIG. 7A, according to one embodiment.

FIGS. 7A and 7B depict placement of mixed diffusion break mechanism cells adjacent to each other, according to one embodiment. Cell 701, similar to cell 401, is a type 3 cell having a SDB at a left edge of the cell, edge 702, and a DDB at a right edge of the cell, edge 703. Cell 711, similar to cell 501, is a type 4 cell having a DDB at a left edge of the cell, edge 712, and a SDB at a right edge of the cell, edge 713. FIG. 7A depicts top view 700*a* of cells 701 and 711 and FIG. 7B depicts cross sectional view 700*b* of cells 701 and 711 at line 710. Top view 700*a* shows active transistor 704 and dummy transistors 705*a* and 705*b* of cell 701 and active transistor 714 and dummy transistors 715*a* and 715*b* of cell 711. Reference lines 706*a*, 706*b*, and 716 (dotted lines) align with the center of diffusion breaks beneath the dummy transistors 705*a*, 705*b*, 715*a*, and 715*b*, respectively. Cross sectional view 700*b* shows diffusion breaks 707*a* and 717 centered with dummy transistors 705*a* and 715*b*, respectively, and diffusion break 707*b* beneath dummy transistors 705*b* and 715*a*. Diffusion break 707*b* is also centered at abutting edges 703 and 712 of cells 701 and 717.

An EDA system may access a library of cells that include distinct layouts for cells of types 1-4 as described herein. For example, the EDA system may access and place a type 3 cell next to another type 4 cell. In some embodiments, the EDA system may initially place cells having diffusion break mechanisms that are exclusively of type 1. The EDA system may access the library described above with all cell types, initially using type 1 cells, or access a library with diffusion break mechanisms that are exclusively of type 1. The EDA system may place the type 1 cells a predetermined distance apart (e.g., one gate pitch as shown in FIGS. 6A and 6B) and modify the cell type after placement. For example, the EDA system places two type 1 cells one gate pitch apart, a first cell on the left of a second cell, and modifies the first cell to a type 3 cell and the second cell to a type 4 cell. Cells 701 and 711 may be the result of either example placement method described above.

In one embodiment of modifying the type 1 cells, the EDA system replaces the type 1 cell with a cell of another type. For example, the EDA system replaces cell 601 with cell 701 and cell 611 with cell 711. In another embodiment of modifying the type 1 cells, the EDA system moves one or more diffusion breaks of the type 1 cell. For example, the EDA system moves diffusion break 607*b* away from the center of cell 601 so that an edge of diffusion break 607*b* aligns with the center of dummy transistor 605*b* at line 606*b*. In this example, the EDA system may also move diffusion break 617*a* away from the center of cell 611 so that an edge of diffusion break 617*a* aligns with the center of dummy transistor 615*a* at line 616*a*.

The EDA system may select which of types 1-4 to use in a layout of an IC design. In one embodiment, the EDA system determines, for each of the four cell types, performance metrics associated with positioning the corresponding cell adjacent to another cell in the IC design. The performance metrics may relate to the effects of diffusion breaks, which adversely affect metrics such as a delay, a slew, dynamic power, or leakage or cells placed near them. In one embodiment of determining performance metrics, the EDA system determines a side of a target cell next to which a cell of one of the four cell types will be placed. The EDA system may access models for each of the four cell types and sides of target cells next to which the cell is placed. The model may be a derate table. For example, the EDA system accesses a derate table corresponding to positioning a type 3 cell at the right side of the target cell. Using these models, the EDA system evaluates the performance metrics corresponding to placing cells of particular diffusion break mechanism types. The EDA system may select a cell from the four cell types based on the determined performance metrics. Thus, the EDA system may optimize for timing or power constraints of the IC design.

Figure 8:
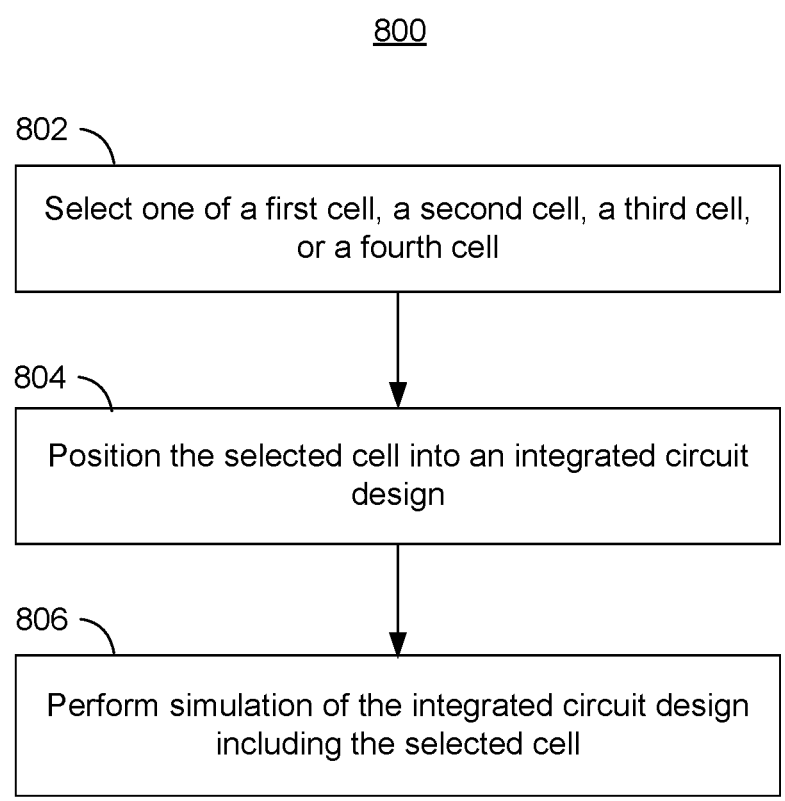
FIG. 8 is a flowchart illustrating a process for designing an integrated circuit, according to at least one embodiment.

FIG. 8 is a flowchart illustrating process 800 for designing an integrated circuit, according to one embodiment. An EDA system may perform process 800. The EDA system may select one cell from a first cell, a second cell, a third cell, and a fourth cell at 802. The first cell may be a type 1 cell, the second cell may be a type 2 cell, the third cell may be a type 3 cell, and the fourth cell may be a type 4 cell. In one example, an EDA system places two cells adjacent to one another in an IC design layout, where a gap is left between the cells (i.e., no other cell is placed one gate pitch horizontally between the two cells) and at least one of the cells includes a diffusion break. The EDA system may perform post-placement tuning of the two cells by modifying a type of a cell. For example, the EDA system may select a type 3 cell to replace a type 1 cell in the layout at 802. The EDA system may select one of the four cells after determining performance metrics associated with positioning each of the four cells in the layout at 802, in one embodiment. For example, the EDA system may determine a respective increase or decrease in performance speed caused by replacing the type 1 cell with each of the alternative types (e.g., types 2-4). The EDA system may determine that the type 3 cell increases the performance speed of the IC design.

The EDA system positions the selected cell into the integrated circuit design at 804. For example, the EDA system positions the type 3 cell to be centered at the same location on the layout as the type 1 cell at 804. The EDA system performs simulation of the integrated circuit design that includes the selected cell at 806. The EDA system may perform transistor simulation of the behavior of the IC design's layout, logic simulation of the logical behavior of a netlist, hard emulation, or any other suitable IC simulation to replicate the behavior of the circuit having the layout including the selected cell at 806.

The process and sequence of steps described above with reference to FIG. 8 are merely illustrative. For example, the process of selecting 802 and positioning 804 may be repeated before proceeding to performing 806 simulation.

Figure 9:
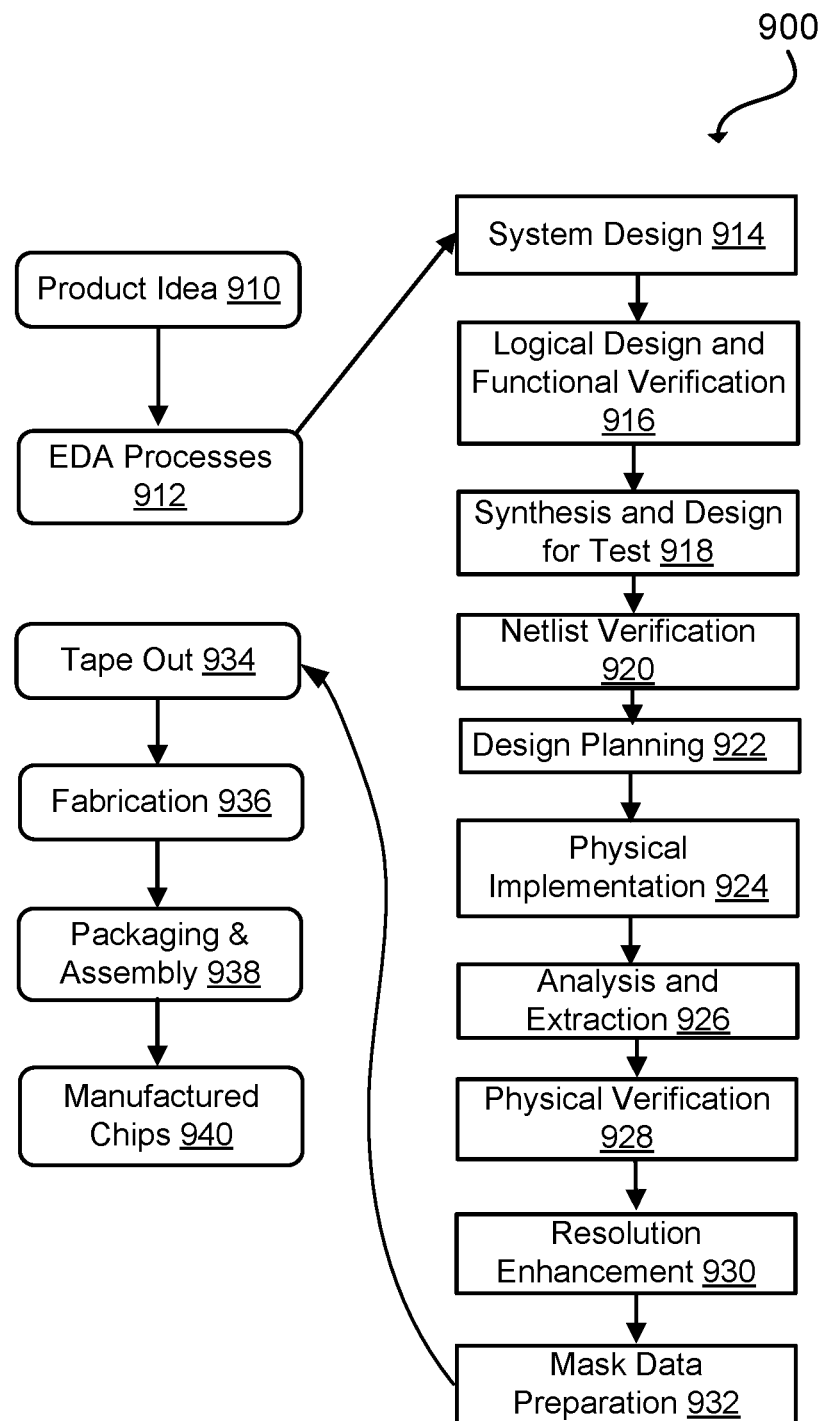
FIG. 9 depicts a flowchart of various processes used during the design and manufacture of an integrated circuit, according to one embodiment.

FIG. 9 illustrates an example set of processes 900 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 910 with information supplied by a designer, information which is transformed to create an article of manufacture that uses a set of EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tape-out, a semiconductor die is fabricated 936 and packaging and assembly processes 938 are performed to produce the finished integrated circuit 940.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 9. The processes described by be enabled by EDA products (or tools).

During system design 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 918, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for production of lithography masks. During mask data preparation 932, the 'tape-out' data is used to produce lithography masks that are used to produce finished integrated circuits.

A storage subsystem of a computer system (such as computer system 1000 of FIG. 10, or host system 907 of FIG. 9) may be used to store the programs and data structures that are used by some or all of the EDA products described herein, and products used for development of cells for the library and for physical and logical design that use the library.

Figure 10:
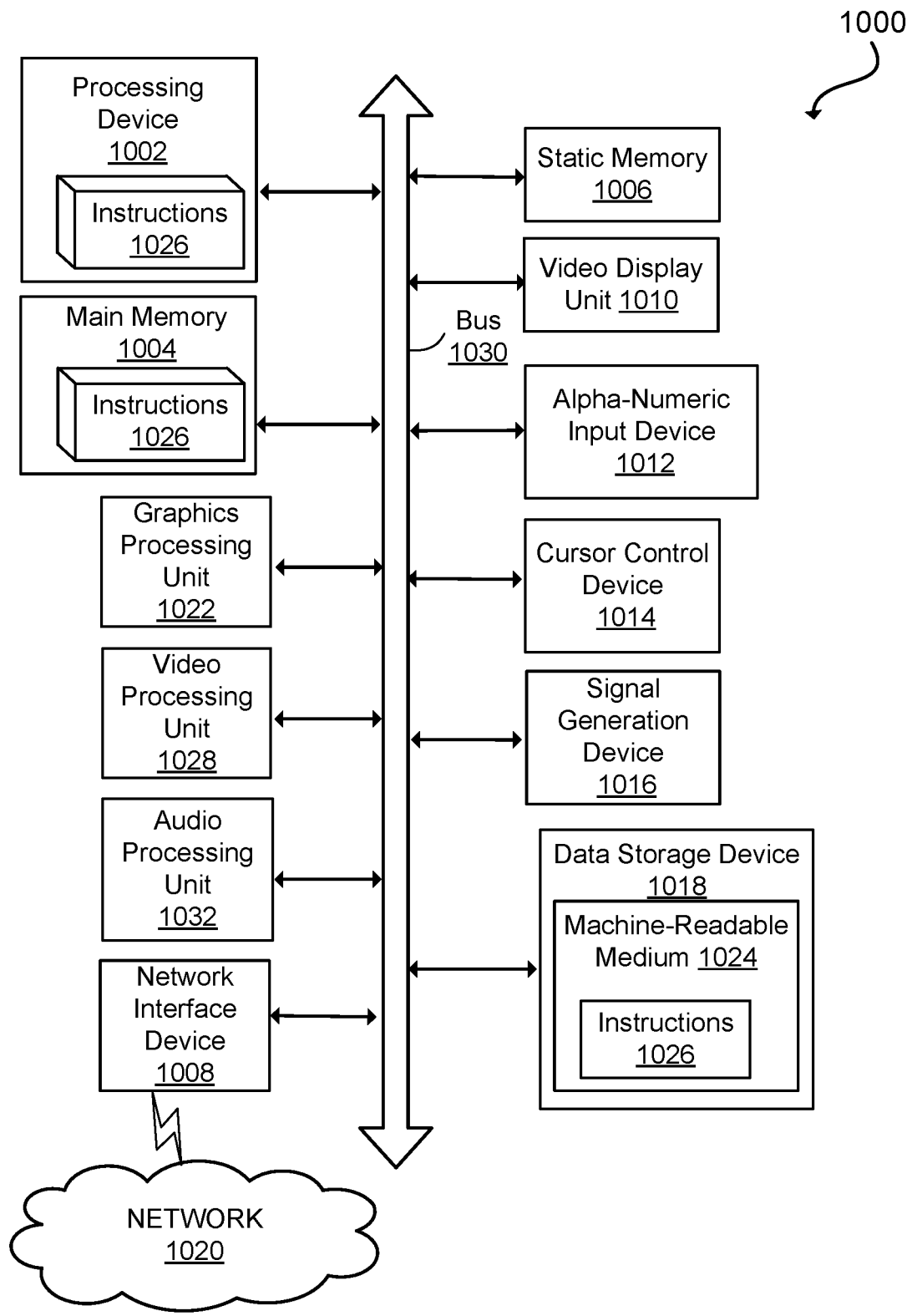
FIG. 10 depicts a diagram of an example computer system in which embodiments of the present disclosure may operate.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a non-transitory computer-readable medium) on which is stored one or more sets of instructions 1026 or software embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A non-transitory computer readable medium storing a digital representation of a cell for designing an integrated circuit, the cell comprising:
    a first edge;
    a second edge at an opposite side of the first edge;
    a first dummy transistor spanning between the first edge of the cell and an edge of a first diffusion break, the first diffusion break centered under the first dummy transistor, and wherein the first diffusion break is centered with the first edge of the cell; and
    a second dummy transistor spanning between the second edge of the cell and an edge of a second diffusion break, the second dummy transistor spanning a distance of half of a gate pitch in the cell.

2. The non-transitory computer readable medium of claim 1, wherein the first dummy transistor and the first diffusion break form a single diffusion break.

3. The non-transitory computer readable medium of claim 1, wherein the second diffusion break isolates a diffusion region within the cell from a diffusion region of an adjacent cell, the second diffusion break centered halfway between the second dummy transistor and a dummy transistor of the adjacent cell.

4. The non-transitory computer readable medium of claim 3, wherein the second dummy transistor, the dummy transistor of the adjacent cell, and the second diffusion break form a double diffusion break.

5. The non-transitory computer readable medium of claim 1, wherein the second diffusion break abuts the second edge of the cell.

6. The non-transitory computer readable medium of claim 1, wherein the second dummy transistor is centered over an edge of the second diffusion break.

7. The non-transitory computer readable medium of claim 1, wherein the cell has a width that is one half of a gate pitch greater than an integer number of gate pitches.

8. A method for designing an integrated circuit design, the method comprising:
    selecting one of a first cell, a second cell, a third cell, or a fourth cell, wherein:
        the first cell comprises:
            a first dummy transistor spanning between a left edge of the first cell and an edge of a first diffusion break, the first diffusion break centered under the first dummy transistor; and
            a second dummy transistor spanning between a right edge of the first cell and an edge of a second diffusion break, the second diffusion break centered under the second dummy transistor,
        the second cell comprises:
            a third dummy transistor spanning between a left edge of the second cell and an edge of a third diffusion break, the third dummy transistor spanning a distance of half of a gate pitch in the second cell; and
            a fourth dummy transistor spanning between a right edge of the second cell and an edge of a fourth diffusion break, the fourth dummy transistor spanning a distance of half of a gate pitch in the second cell,
        the third cell comprises:
            a fifth dummy transistor spanning between a left edge of the third cell and an edge of a fifth diffusion break, the fifth diffusion break centered under the fifth dummy transistor, and wherein the fifth diffusion break is centered with the left edge of the third cell; and
a sixth dummy transistor spanning between a right edge of the third cell and an edge of a sixth diffusion break, the sixth dummy transistor spanning a distance of half of a gate pitch in the third cell, and
the fourth cell comprises:
a seventh dummy transistor spanning between a left edge of the fourth cell and an edge of a seventh diffusion break, the seventh dummy transistor spanning a distance of half of a gate pitch in the fourth cell; and
an eighth dummy transistor spanning between a right edge of the fourth cell and an edge of an eighth diffusion break, the eighth diffusion break centered under the eighth dummy transistor, and wherein the eighth diffusion break is centered with the right edge of the fourth cell;
positioning the selected cell into the integrated circuit design; and
performing simulation of the integrated circuit design comprising the selected cell.

9. The method of claim 8, wherein selecting one of the first cell, the second cell, the third cell, and the fourth cell comprises:
determining, for each of the four cells, performance metrics associated with positioning the respective cell adjacent to another cell in the integrated circuit design; and
selecting the cell based on the determined performance metrics to optimize for one or more of timing and power constraints of the integrated circuit design.

10. The method of claim 9, wherein determining performance metrics associated with positioning the respective cell adjacent to the other cell in the integrated circuit design comprises:
determining a side of the respective cell to position the other cell; and
responsive to determining to position the other cell at the left edge of the respective cell, accessing a model associated with positioning the other cell at the left edge of the respective cell, the model including the performance metrics.

11. The method of claim 8, wherein positioning the selected cell into the integrated circuit design comprises replacing a previously placed cell within the integrated circuit design with the selected cell.

12. The method of claim 8, wherein the first cell comprises a first single diffusion break comprising the first dummy transistor and the first diffusion break and a second single diffusion break comprising the second dummy transistor and the second diffusion break.

13. The method of claim 8, wherein the second cell comprises a first double diffusion break comprising the third dummy transistor and the third diffusion break and a second double diffusion break comprising the fourth dummy transistor and the fourth diffusion break.

14. The method of claim 8, wherein the third cell comprises a single diffusion break comprising the fifth dummy transistor and the fifth diffusion break and a double diffusion break comprising the sixth dummy transistor and the sixth diffusion break.

15. The method of claim 8, wherein the fourth cell comprises a double diffusion break comprising the seventh dummy transistor and the seventh diffusion break and a single diffusion break comprising the eighth dummy transistor and the eighth diffusion break.

16. An integrated circuit at least partially instantiated from a cell, the cell comprising:
a first edge;
a second edge at an opposite side of the first edge:
a first dummy transistor spanning between the first edge of the cell and an edge of a first diffusion break, the first diffusion break centered under the first dummy transistor, and wherein the first diffusion break is centered with the first edge of the cell; and
a second dummy transistor spanning between the second edge of the cell and an edge of a second diffusion break, the second dummy transistor spanning a distance of half of a gate pitch in the cell.

17. The integrated circuit of claim 16, wherein the first dummy transistor and the first diffusion break form a single diffusion break.

18. The integrated circuit of claim 16, wherein the second diffusion break isolates a diffusion region within the cell from a diffusion region of an adjacent cell, the second diffusion break centered halfway between the second dummy transistor and a dummy transistor of the adjacent cell.

19. The integrated circuit of claim 18, wherein the second dummy transistor, the dummy transistor of the adjacent cell, and the second diffusion break form a double diffusion break.

* * * * *